United States Patent
Robinson et al.

(10) Patent No.: US 11,403,429 B1
(45) Date of Patent: Aug. 2, 2022

(54) PER INSTANCE CORE CONTROL IN ACCELERATED COMPUTING ENVIRONMENTS

(71) Applicant: Xilinx, Inc., San Jose, CA (US)

(72) Inventors: David Robinson, Loanhead (GB); Raymond Kong, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 339 days.

(21) Appl. No.: 16/685,921

(22) Filed: Nov. 15, 2019

(51) Int. Cl.
*G06F 21/00* (2013.01)
*G06F 21/71* (2013.01)
*G06F 21/10* (2013.01)

(52) U.S. Cl.
CPC .............. *G06F 21/71* (2013.01); *G06F 21/10* (2013.01); *G06F 2221/0773* (2013.01)

(58) Field of Classification Search
CPC ................................ G06F 21/10; G06F 21/71
See application file for complete search history.

(56) References Cited

U.S. PATENT DOCUMENTS

2011/0154011 A1* 6/2011 Efraim .................... G06F 21/64
713/100

* cited by examiner

*Primary Examiner* — Jeffrey C Pwu
*Assistant Examiner* — Thong P Truong
(74) *Attorney, Agent, or Firm* — Kevin T. Cuenot

(57) ABSTRACT

Controlling functionality of a core on a per-instance basis can include implementing, within an accelerator, an instance of a core by configuring the accelerator using configuration data, receiving, within the instance of the core, encrypted authorization data for the instance of the core, generating, using control circuitry of the instance of the core, decrypted authorization data for the instance of the core by decrypting the encrypted authorization data using a core instance identifier stored in a first control register of the instance of the core, and writing the decrypted authorization data to a second control register in the instance of the core, wherein the instance of the core enables core functionality therein based on the decrypted authorization data in the second control register.

20 Claims, 7 Drawing Sheets

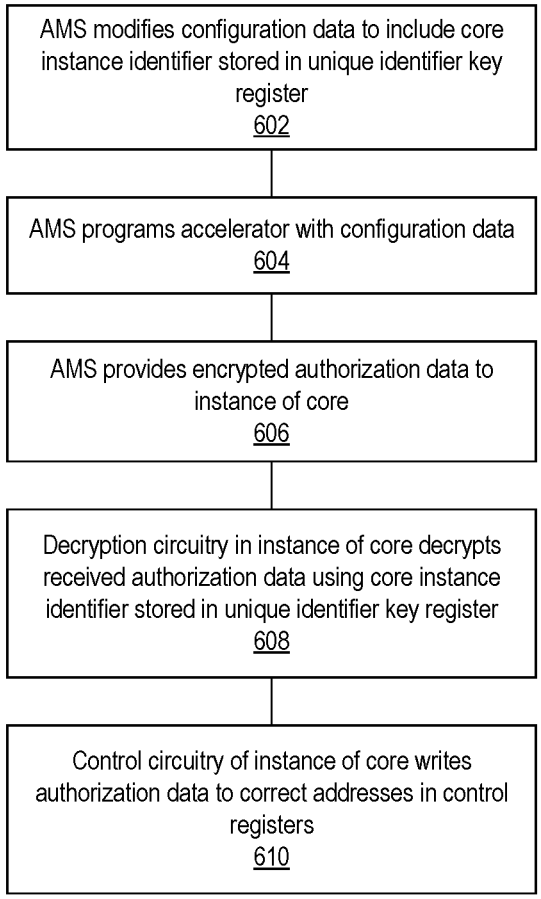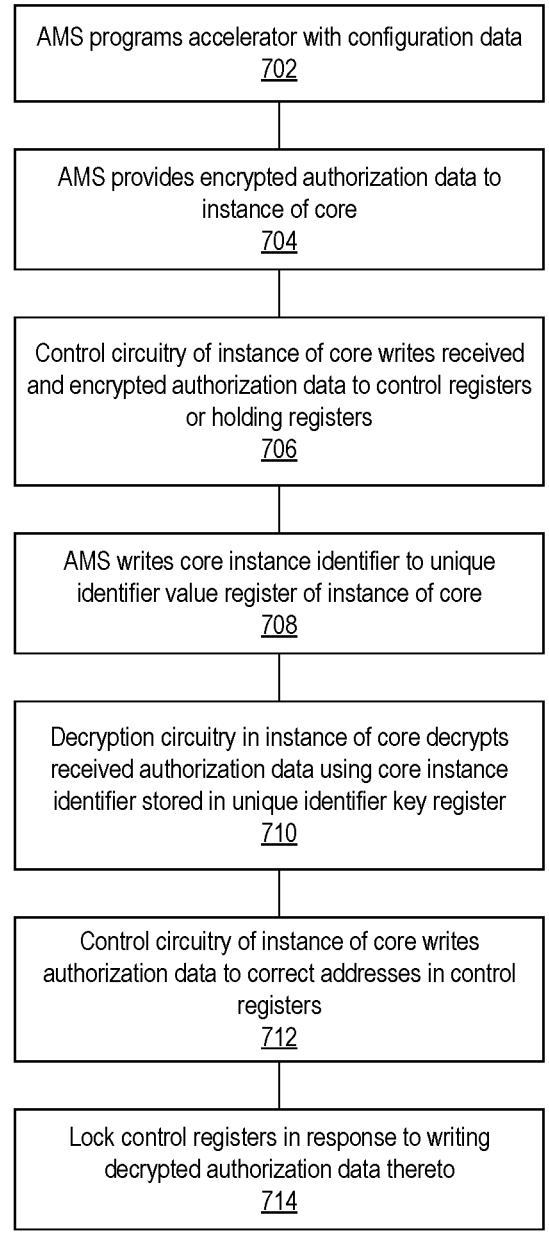
FIG. 6
FIG. 7

800

- Implement an instance of a core by configuring the accelerator using configuration data
  802
- Receive encrypted authorization data for the instance of the core
  804
- Generate decrypted authorization data for the instance of the core by decrypting the encrypted authorization data using a core instance identifier stored in a first control register of the core
  806
- Write the decrypted authorization data to a second control register in the instance of the core, wherein the instance of the core enables core functionality therein based on the decrypted authorization data in the second control register
  808

- In response to determining a need for implementing a user circuit design in an accelerator, retrieve configuration data for the user circuit design
  902
- Determine that the user circuit design includes an instance of a core that requires licensing
  904
- Implement the instance of the core within the accelerator by providing the configuration data for the instance of the core to the accelerator
  906
- Determine authorization data for the instance of the core
  908
- Provide the authorization data to the instance of the core, wherein the authorization data is encrypted
  910
- Provide core instance identifier to accelerator for decrypting the authorization data to enable functionality of the instance of the core
  912

FIG. 9

PER INSTANCE CORE CONTROL IN ACCELERATED COMPUTING ENVIRONMENTS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to controlling operation of cores implemented within ICs within accelerated computing environments.

BACKGROUND

Many computing systems utilize an architecture that includes a host processor communicatively linked to one or more other processing devices referred to as "accelerators." The host processor is typically implemented as a central processing unit (CPU). In most cases, the accelerators are architecturally different from the host processor. As such, the accelerators typically offer advantages over the host processor in terms of increased processing speed, reduced power consumption, redundancy, etc. The accelerators are capable of performing jobs offloaded from the host processor and making results of the jobs available to the host processor.

In some cases, the accelerators are adapted to execute program code. Such accelerators typically have an instruction set architecture that differs from the host processor. Examples of these types of accelerators include, but are not limited to, graphics processing unit(s) (GPUs), digital signal processor(s) (DSPs), and so forth. In other cases, the accelerators include circuitry that is capable of performing the offloaded job in hardware as opposed to executing instructions. Examples of accelerators capable of performing jobs in hardware include programmable integrated circuits (ICs) such as field programmable gate arrays (FPGAs), partially programmable ICs, application specific ICs (ASICs), and so forth. A computing system may include a combination of different accelerator types.

SUMMARY

In one aspect, a method includes implementing, within an accelerator, an instance of a core by configuring the accelerator using configuration data, receiving, within the instance of the core, encrypted authorization data for the instance of the core, and generating, using control circuitry within the instance of the core, decrypted authorization data for the instance of the core by decrypting the encrypted authorization data using a core instance identifier stored in a first control register of the instance of the core. The core instance identifier is unique to the instance of the core. The method can include writing the decrypted authorization data to a second control register in the instance of the core, wherein the instance of the core enables core functionality therein based on the decrypted authorization data in the second control register.

In another aspect, a system includes a host processor configured to initiate operations. The operations include, in response to determining a need for implementing a user circuit design in an accelerator, retrieving configuration data for the user circuit design, determining that the user circuit design includes an instance of a core that requires licensing, implementing the instance of the core within the accelerator by providing the configuration data for the instance of the core to the accelerator, and determining authorization data for the instance of the core. The operations can also include providing the authorization data to the instance of the core, wherein the authorization data is encrypted. A core instance identifier is provided to the accelerator for decrypting the authorization data to enable functionality of the instance of the core. The core instance identifier is unique to the instance of the core.

In another aspect, a device includes an instance of a core implemented in programmable logic by loading configuration data, a plurality of control registers implemented in the instance of the core. The plurality of control registers include a first control register configured to store a core instance identifier that uniquely identifies the instance of the core and a second control register that, when written with authorization data from a host computing system, determines enablement of core functionality of the instance of the core.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates an example method of programming the authorization data into the accelerator.

FIG. 7 illustrates another example method of programming the authorization data into the accelerator.

FIG. 8 is an example method of operation for an accelerator as described in connection with FIGS. 1-7 of this disclosure.

FIG. 9 is an example method of operation for a host system as described in connection with FIGS. 1-7 of this disclosure.

DETAILED DESCRIPTION

Figure 1:
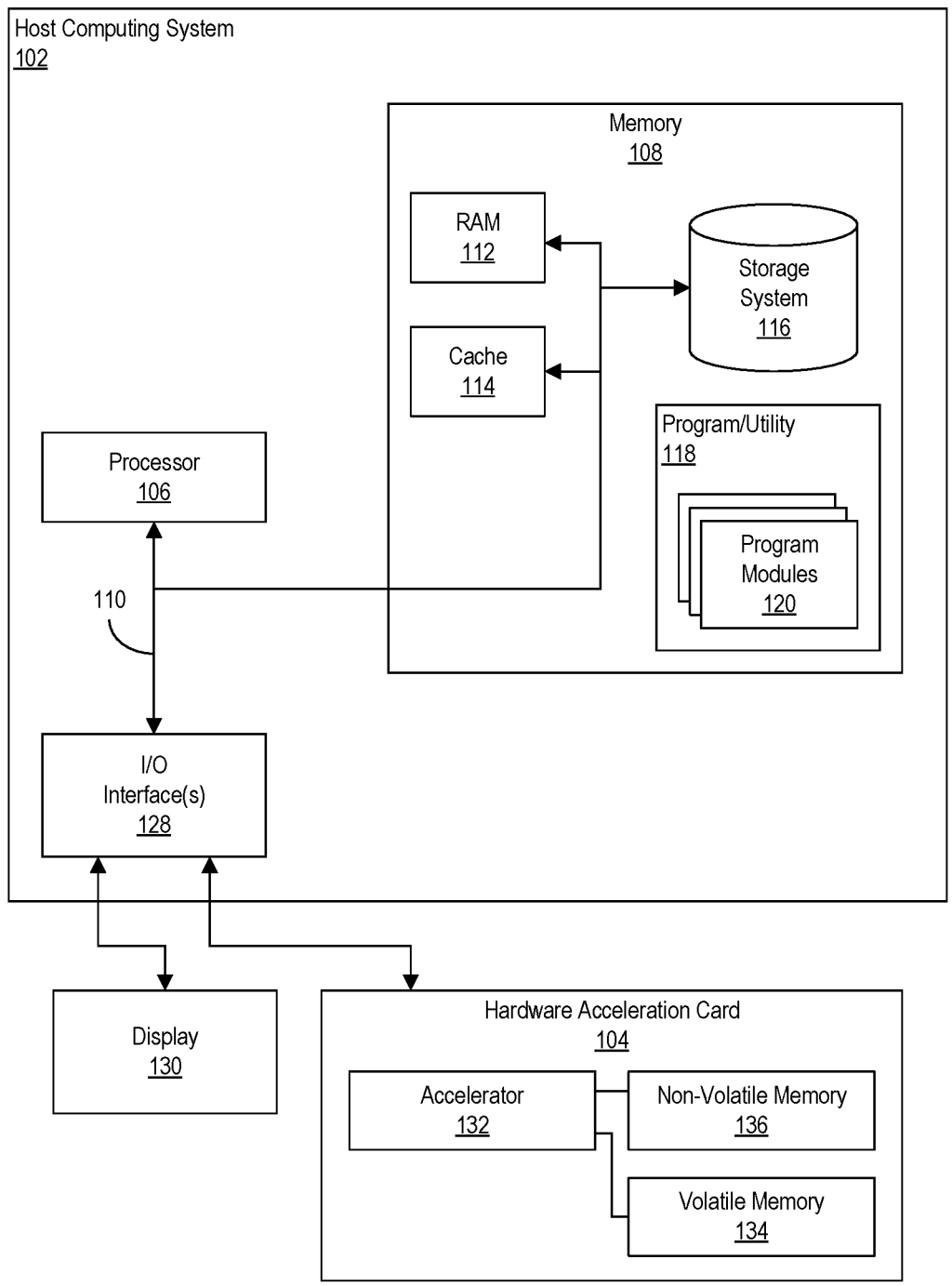
FIG. 1 illustrates an example computing environment for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to controlling operation of cores implemented within ICs within accelerated computing environments. Within computing systems that utilize accelerators, cores are often implemented within the accelerators. User circuit designs, for example, often include one or more instances of a core or cores that may require authorization. These cores are often subject to certain restrictions or limitations in their use.

Examples of such restrictions may include "only use at most 5 instances of the core at any time" or "operate at full throughput for the first 1,000 instances, but at a quarter throughput on any more than the first 1,000 instances unless a higher level of authorization is purchased." It is difficult, however, for core providers (e.g., core vendors) to control and/or restrict access to their cores or the functionality of their cores once a user has purchased a license to use the core. Often, the only enforcement options available to core providers are non-technical legal remedies. These may be inadequate for a variety of reasons ranging from the size of the entities involved in a dispute and/or the legal jurisdictions involved.

As defined herein, the term "core" means a pre-designed and reusable unit of circuitry specified as a data structure describing hardware that performs a particular function. For example, a core may be expressed as a pre-designed and reusable unit of logic, cell, or chip layout design. A core, sometimes referred to as an "Intellectual Property Core" or "IP," may be expressed using hardware description language file(s), as a netlist, as a bitstream that programs a programmable IC, or the like. Some cores include an optimally floor-planned layout targeted to a specific family of ICs. Cores also may be parameterizable in that a user may enter parameters to activate or change certain functionality of a core. A core may be used as a building block within circuit designs adapted for implementation within an application-specific integrated circuit (ASIC), a programmable IC, e.g., an FPGA, System-on-Chips (SoCs), and/or other types of ICs.

As defined within this specification, the term "instance," in reference to a core, means a particular implementation of the core. One instance of a core may be identical to another instance of the core or may be a copy of the core that is programmed or configured (e.g., parameterized) differently than another instance of the core. An instance of a core may be specified in a circuit design and then physically implemented in an IC such as an accelerator. Each instance of a core, whether specified in a circuit design or physically implemented in an IC, represents, or is, a distinct and independent copy or implementation of that core in the accelerator.

In accordance with the inventive arrangements described within this disclosure, use of cores implemented in ICs can be controlled on a per-instance basis. Instances of cores may be controlled in small scale computing environments having a single computing system, in large scale computing environments such as data centers, or in other computing environments in between. A framework is provided that allows core providers to control authorization, e.g., licensing, of each core on a per-instance basis and control enforcement of restrictions on each instance of each core without incurring significant overhead in the IC in which the core(s) is/are implemented or in the servers that use and/or access the accelerators. The framework provides an open architecture that promotes increased granularity of control while also not limiting what may be licensed or how items may be licensed.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. Computing environment 100 includes a host computing system (host system) 102 coupled to a hardware acceleration card (card) 104. As such, computing environment 100 is an example of an accelerated computing environment. The components of host system 102 may include, but are not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host system 102 typically includes a variety of computer readable media. Such media may be any available media that is accessible by host system 102 and may include any combination of volatile media, non-volatile media, removable media, and/or non-removable media.

Memory 108 may include computer readable media in the form of volatile memory, such as random-access memory (RAM) 112 and/or cache memory 114. Host system 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies as described herein at least with respect to operations performed by host system 102. For example, program modules 120 may implement a software stack. The software stack may implement accelerator management software capable of communicating with and/or managing operation of accelerator 132.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 102 may include one or more Input/Output (I/O) interfaces 128 communicatively linked to bus 110. I/O interface(s) 128 allow host system 102 to couple to and communicate with external devices. The external devices may allow user(s) to interact with host system 102, allow host system 102 to communicate with other computing devices, and the like. For example, host system 102 may be communicatively linked to a display 130 and to card 104 through I/O interface(s) 128. Host system 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host system 102 communicates with card 104 is a PCIe adapter. Card 104 may be implemented as a circuit board that couples to host system 102. Card 104 may, for example, be inserted into a card slot, e.g., an available bus and/or PCIe slot, of host system 102 or a rack or other chassis coupled to host system 102.

Card 104 includes an accelerator 132. As defined herein, the term "accelerator" is an IC. An accelerator is a device that may have a different architecture than the host processor (e.g., processor 106). In one aspect, accelerator 132 may be a programmable IC such as a field programmable gate array (FPGA) or other IC that includes at least some programmable circuitry (e.g., programmable logic). An example architecture for accelerator 132 is described in connection with FIG. 10. Card 104 includes a volatile memory 134 and a non-volatile memory 136 each coupled to accelerator 132. Volatile memory 134 may be implemented as a RAM that is external to accelerator 132, but is still considered a "local memory" of accelerator 132, whereas memory 108, being within host system 102, is not considered local to accelerator 132. Non-volatile memory 136 may be implemented as flash memory. Non-volatile memory 136 is also external to accelerator 132 and may be considered local to accelerator 132.

FIG. 1 is not intended to suggest any limitation as to the scope of use or functionality of the examples described herein. Host system 102 is an example of computer hardware (e.g., a system) that is capable of performing the various operations described within this disclosure relating to card 104 and/or accelerator 132.

Host system 102 is only one example implementation of a computer that may be used with a card 104 and/or accelerator 132. Host system 102 is shown in the form of a computing device, e.g., a computer or server. Host system 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs and/or other accelerators) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using host system 102 or other suitable data processing system, generally support the FPGA-as-a-Service (FaaS) model. In the FaaS model, user functions are hardware accelerated as circuit designs implemented within programmable ICs operating under control of the host systems. Other examples of cloud computing models are described in the National Institute of Standards and Technology (NIST) and, more particularly, the Information Technology Laboratory of NIST.

Host system 102 is operational with numerous other general-purpose or special-purpose computing system environments or configurations. Examples of computing systems, environments, and/or configurations that may be suitable for use with host system 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
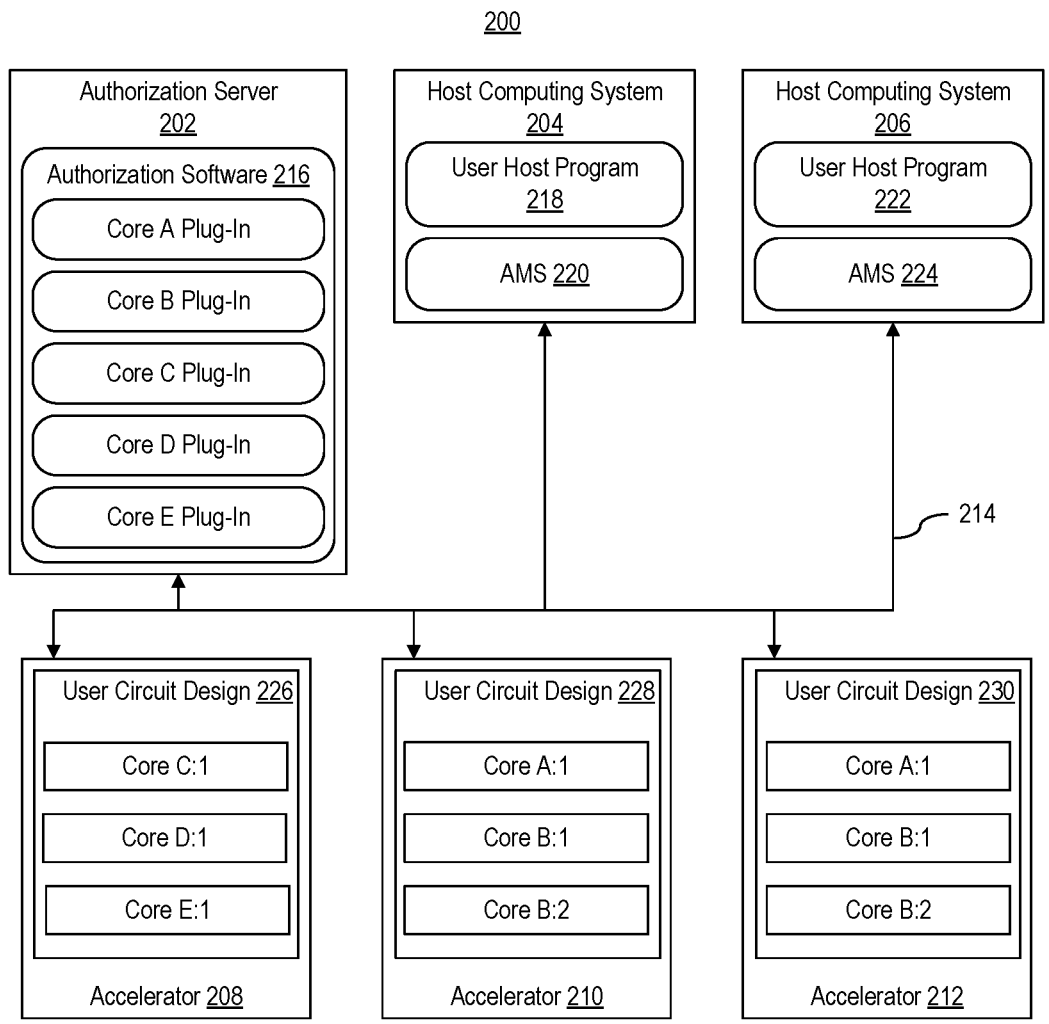
FIG. 2 is another example of a computing environment for use with the inventive arrangements described within this disclosure.

FIG. 2 is another example of a computing environment 200. Computing environment 200 is also an example of an accelerated computing environment. In the example, computing environment 200 includes an authorization server 202, host computing systems (host systems) 204, 206, and accelerators 208, 210, and 212. Authorization server 202 and host systems 204, 206 each may be implemented as a computing system as described in connection with FIG. 1. For purposes of illustration, accelerators 208, 210, and 212 are not shown disposed on hardware acceleration cards, but would be in an actual implementation as described in connection with FIG. 1. Authorization server 202, host systems 204, 206, and accelerators 208, 210, and 212 are coupled, e.g., communicatively linked, via a network 214, a bus, or via other connections.

In the example, authorization server 202 and host systems 204, 206 are illustrated as separate and distinct computing systems. This computing architecture provides security in that the software within authorization server 202, which may be provided by a trusted third party, is physically isolated and separate from user program code that executes in host systems 204, 206. In another example, however, authorization server 202, e.g., the applications and/or program code executing therein, may be implemented in host system 204 or within host system 206. In another aspect, each of authorization server 202 and host systems 204, 206 may be implemented as a virtual server executing in one or more physical computing systems.

In one aspect, computing environment 200 is representative of a data center that includes a plurality of host systems and a plurality of accelerators. An actual data center may include more host systems and more accelerators than illustrated in the example of FIG. 2. The inventive arrangements are not intended to be limited by the particular number of host systems and/or accelerators shown.

In the example, authorization server 202 is capable of executing authorization software 216. In one example, authorization software 216 provides a trusted software framework in which software for authorizing (e.g., licensing) instances of cores utilized within the various user circuit designs 226, 228, and 230 may execute. Authorization software 216 provides a plug-in framework in which program code from core provider(s) may execute. As an example, authorization software 216 may execute a plug-in for each of cores A, B, C, D, and E as implemented in accelerators 208, 210, and 212. The plug-in for a core may be provided by the core provider.

Each plug-in is capable of authorizing the corresponding core instances as implemented in the respective accelerators 208, 210, and 212. For example, each core plug-in (e.g., core A plug-in, core B plug-in, core C plug-in, core D plug-in, and core E plug-in) is capable of communicating with the respective core provider server to obtain authorization data that may be used to authorize each instance of the cores A, B, C, D, and E implemented in accelerators 208, 210, and/or 212.

In the example, host system 204 includes (e.g., executes) user host program 218 and accelerator management software (AMS) 220. Host system 206 includes (e.g., executes) user host program 222 and accelerator management software (AMS) 224. User host programs 218 and 222 are user software executed by host systems 204, 206, respectively. Each user host program 218, 222 is capable of invoking accelerators 208, 210, and 212. User host programs 218, 222, for example, are capable of requesting implementation of user circuit designs 226, 228, and/or 230 within accelerators 208, 210, 212, respectively. User host program 218 may correspond to a different user than user host program 222.

Accelerator 208 implements user circuit design 226. Accelerator 210 implements user circuit design 228. Accelerator 212 implements user circuit design 230. Within FIG. 2, cores within user circuit designs 226, 228, and 230 are labeled with a letter indicating the particular core followed by a number indicating the instance of the core. For example, a first instance of core A is shown as "Core A:1." For purposes of illustration, user circuit design 226 includes a first instance of core C, a first instance of core D, and a first instance of core E. User circuit design 228 includes a first instance of core A, a first instance of core B, and a second instance of core B. User circuit design 230 includes a first instance of core A, a first instance of core B, and a second instance of core B. In the example, each of accelerators 210 and 212 includes two separate and distinct instances (e.g., implementations) of core B.

For purposes of discussion, cores A, B, C, D, and E are cores that have been integrated into user circuit designs for which a license must be obtained. User circuit designs 226, 228, and 230 may be for different users. In the example, accelerators 210 and 212 are configured with the same configuration data and implement same circuitry. For example, user circuit designs 228 and 230 may be equivalent, though correspond to different users.

The authorization for each instance of a core may be handled by the corresponding core plug-in. For example, the authorization of any instance of core A implemented within an accelerator may be handled by the core A plug-in in authorization server 202. The authorization of any instance of core B implemented within an accelerator may be handled by the core B plug-in in authorization server 202, and so on. In this regard, each instance of a core, while implemented in an accelerator, may be completely disabled or inoperative until particular core functionality of that instance of the core is enabled by the corresponding core plug-in, whether directly or indirectly.

In one aspect, each core plug-in executing in authorization software 216 is capable of communicating with a server of the core provider to obtain authorization data. In another aspect, each core plug-in is capable of generating authorization data independently (e.g., without communicating with) a server of the core provider. Appreciably, in other implementations, one or more core plug-ins may generate authorization data independently of the server(s) of the core provider(s) while one or more other core plug-ins obtain the authorization data from the server(s) of the core provider(s).

Authorization data refers to licensing data for an instance of a core. The authorization data may be obtained and specified on a per core and per instance basis. Thus, whether instance 1 of core B in accelerator 210 is enabled and/or particular core functionality of instance 1 of core B is enabled is independent of whether particular core functionality of instance 2 of core B in accelerator 210 is enabled. The same is true across different accelerators such as accelerator 210 and accelerator 212.

While each core plug-in is capable of communicating with a corresponding core provider server, authorization software 216 is capable of routing authorization requests for particular instances of cores to the correct core plug-in. In this regard, authorization software 216, which may be provided by a trusted third party, is capable of managing the authorization process without having detailed knowledge of the cores implemented in accelerators 208, 210, and/or 212. For example, authorization software 216 may be provided by the provider and/or manufacturer of accelerators 208, 210, and/or 212. In one aspect, each core plug-in may also communicate with AMS 220, 224 via authorization software 216 to obtain usage data for core instances so that each core plug-in may pass such information back to the core provider. In another aspect, authorization software 216 may collect such information and manage billing on behalf of the core providers.

In the example of FIG. 2, authorization server 202 is described as executing authorization software 216 which provides a plug-in framework for vendor provided core plug-ins. It should be appreciated that the software architecture described in connection with FIG. 2 is for purposes of illustration and not limitation. Other software architectures may be used that differ from the example described.

Figure 3:
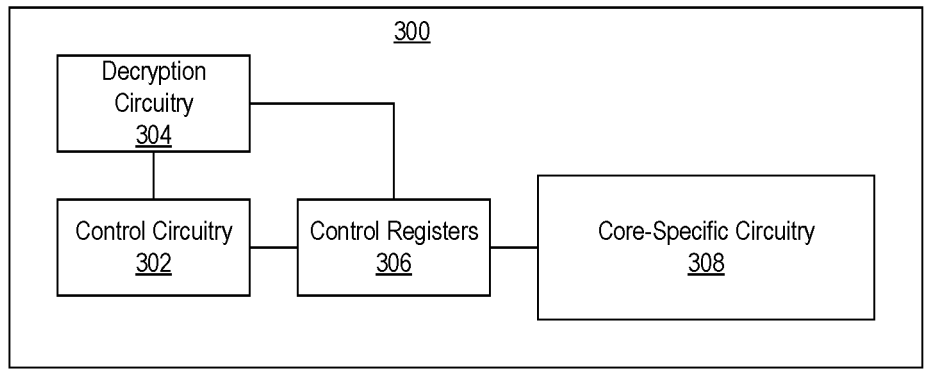
FIG. 3 illustrates an example implementation of a core as described in connection with FIG. 2.

FIG. 3 illustrates an example implementation of a core 300. For purposes of illustration, core 300 is a core that is licensable. Core 300 may include control circuitry 302, optional decryption circuitry 304, and control registers 306. Core 300 further includes core-specific circuitry 308 that is capable of performing the intended operations and/or core functionality of core 300 based on the authorization data that is written to control registers 306.

Control circuitry 302 may be coupled to communication circuitry implemented in the accelerator. For example, the accelerator may include a PCIe endpoint, whether hardwired or implemented using programmable logic, to which control circuitry 302 is coupled. Via the PCIe endpoint, host systems 204, 206 may communicate and send authorization data to be written to control registers 306. It should be appreciated that the particular type of communication interface included in the accelerator that is coupled to control circuitry 302 may differ based on the particular communication channel over which the accelerator communicates with host systems 204, 206.

In one or more example implementations, the authorization data may be encrypted and require decrypting by decryption circuitry 304. Decryption circuitry 304 may access control registers 306 to retrieve the key necessary for decrypting the received authorization data. Once the authorization data is decrypted, if necessary, control circuitry 302 may write the authorization data into control registers 306.

In one aspect, the authorization data may be specified as one or more address-data pairs. Accordingly, control circuitry 304 is capable of writing each data item to the particular control register address specified for the data item of the pair. Writing the authorization data to control registers 306, or selected control registers, enables selected core functionality of core 300 and, for example, core-specific circuitry 308.

Examples of core functionality that may be enabled (or disabled) by virtue of the authorization data written to control registers 306 may include throttling the throughput of core 300 (e.g., controlling whether core 300 operates at full throughput or a lesser throughput), controlling the amount of time that core 300 may remain operable or operable at a particular throughput level before being throttled, enabling all operations that may be performed by core-specific circuitry 308, enabling selected operations while disabling others that may be performed by core-specific circuitry 308, restricting the number of instances of a core that may be created in total or concurrently at any given time, etc.

Other examples of core functionality that may be controlled by the authorization data written to control registers 306 may include only allowing up to N (where N is an integer value, e.g., a maximum limit in this case) instances of the core to run at the same time throughout the accelerated computing environment (e.g., across different accelerators); only allowing N instances to run in total, where starting to execute an IP instance permanently consumes a license; limiting the total daily runtime (or operations) of all instances of a core (e.g., where the purchased license allows for a defined number of hours of combined runtime per day); limiting the functionality of one (or more) instances (e.g., limiting time an instance of a core operates or limiting features of the core that can be used by the instance); limiting the number of operations an instance can process; and/or reducing the performance of an instance (e.g., halving the performance by inserting wait states between data being processed). The foregoing are for purposes of example and not limitation. Each core provider may define the core functionality and how such core functionality is controlled. The authorization server, e.g., authorization software 216 and/or AMS need not know the particular details of how or what is enabled for each instance of each core.

In view of the foregoing, each instance of a core must be able to limit its own operation when instructed to do so by way of the authorization data written to control registers 306. For example, if an instance of a core is to be time limited, the core must be designed to include a mechanism that is capable of disabling operation of the core after a period of time as dictated by the authorization data stored in control registers 306. The core must be programmable to enable and control such behavior by way of control registers 306.

Figure 4:
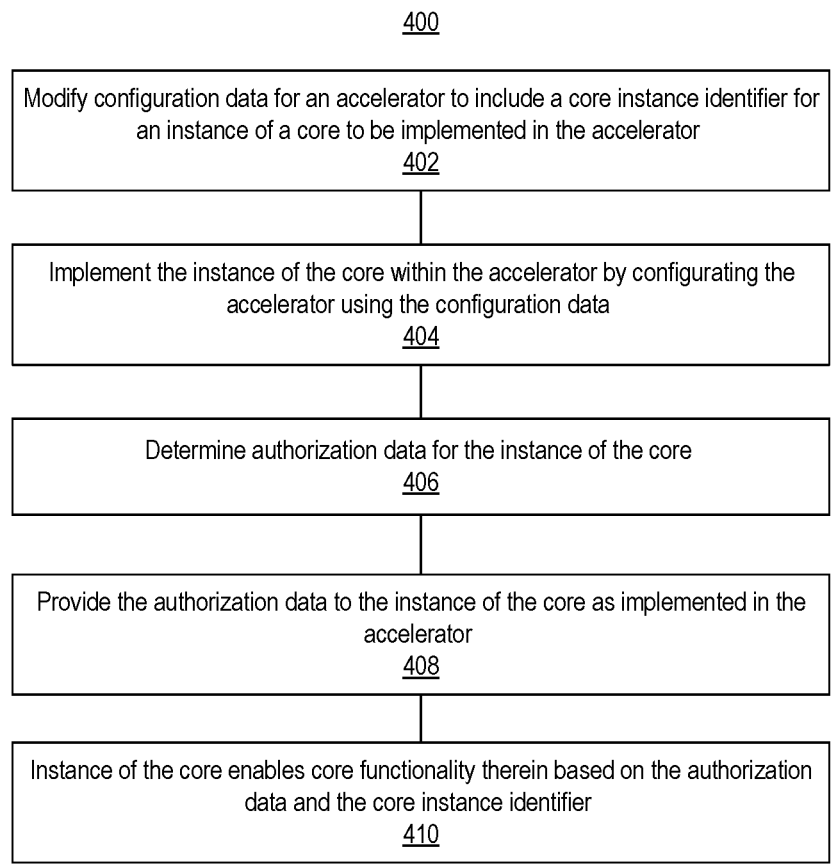
FIG. 4 illustrates an example method of controlling cores within a computing environment that uses accelerators.

FIG. 4 illustrates an example method 400 of controlling cores within a computing environment that uses accelerators. Method 400 may be implemented to control cores on a per instance basis.

In block 402, the system, e.g., the AMS in a host system, is capable of modifying configuration data for an accelerator to include a core instance identifier for an instance of a core to be implemented in the accelerator. In block 404, the system, e.g., the AMS, is capable of implementing the instance of the core within the accelerator by configuring the accelerator using the configuration data. In block 406, the system, e.g., the authorization server, is capable of determining authorization data for the instance of the core. In block 408, the system, e.g., the AMS, is capable of providing the authorization data to the instance of the core as implemented in the accelerator. In block 410, the instance of the core enables core functionality therein based on the authorization data and the core instance identifier.

Figure 5:
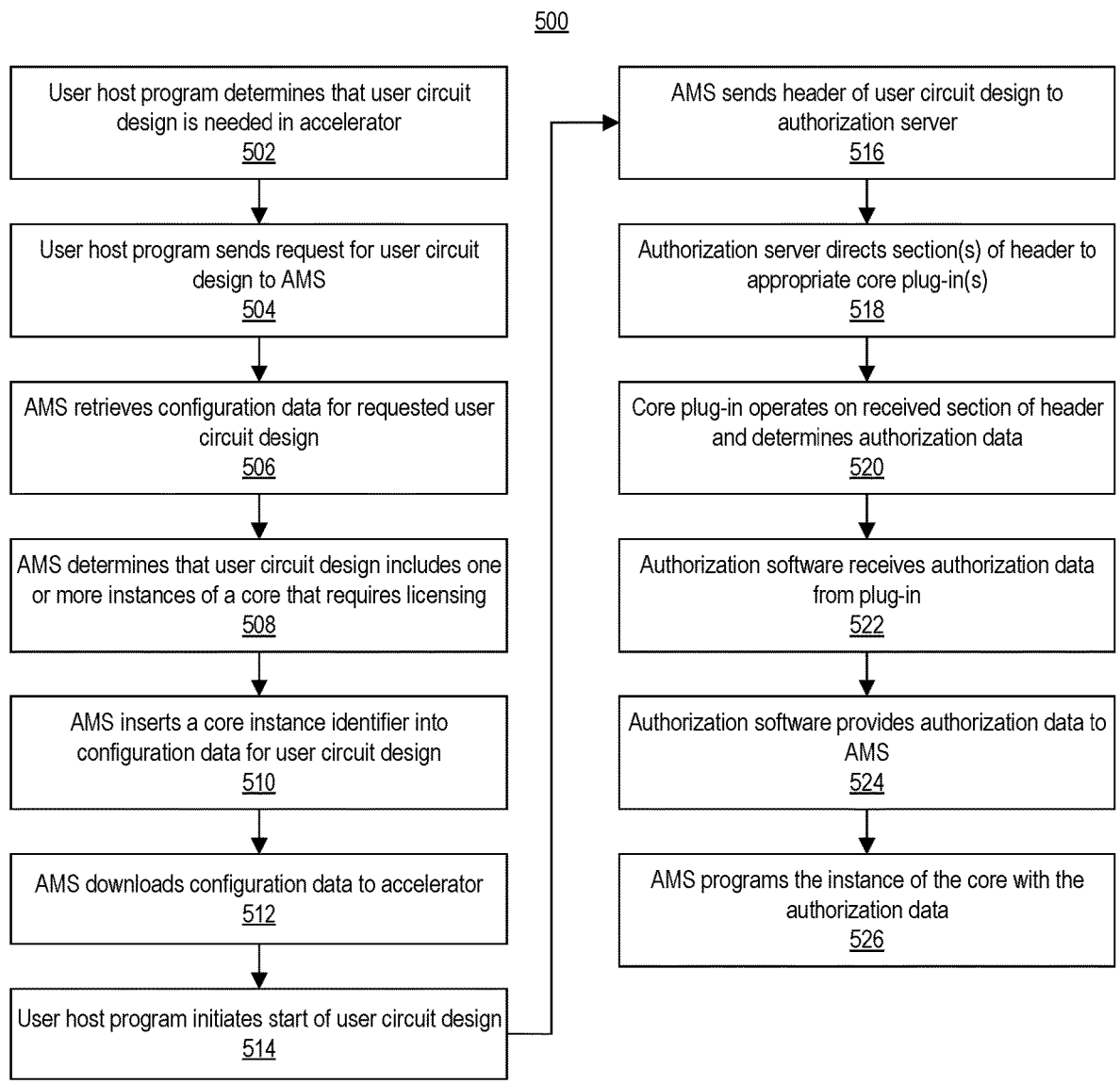
FIG. 5 illustrates another example method of controlling cores within a computing environment that uses accelerators.

FIG. 5 illustrates another example method 500 of controlling cores within a computing environment that uses accelerators. Method 500 illustrates a more detailed process than described in connection with FIG. 4. Method 500 is described in the context of controlling an instance of a core (e.g., a single instance of a core). It should be appreciated that the techniques described in connection with FIG. 5 may be expanded to control operation of multiple instances of a core and/or multiple instances of multiple, different cores whether implemented in one accelerator or across a plurality of accelerators. Further, reference to the AMS in the context of FIG. 5 is the AMS executing within a particular host system. Method 500 may be expanded by multiple AMSs in a data center operating in parallel in different host systems responding to the user host programs executing in such host systems.

In block 502, a user host program executing in a host system determines that a user circuit design is needed within an accelerator. For example, the user host program, in executing, initiates a processing task that is to be performed by an accelerator. The user host program, for example, may include a function call that identifies a particular user circuit design to be implemented in the accelerator.

In block 504, the user host program sends a request for the user circuit design to the AMS executing therein. For example, the user host program may execute a function that communicates with the AMS and passes the name of the user circuit design thereto.

In block 506, the AMS retrieves the configuration data, e.g., a configuration bitstream, for the requested user circuit design. The configuration data for the requested user circuit design may be stored in a data storage device coupled to the host system, whether local or remote.

In block 508, the AMS determines that the user circuit design includes an instance of a core that requires licensing (e.g., authorization) for use. For example, the AMS is capable of parsing the configuration bitstream to determine that the user circuit design includes an instance of a core that requires licensing. In one example implementation, the configuration data for the requested user circuit design includes a header that may be read, at least partially, by the AMS to determine whether the user circuit design includes an instance of a core that requires licensing.

Listing 1 illustrates an example header implementation that may be included with the configuration bitstream specifying the user circuit design.

Listing 1

```
<Licensing Information Start>
<General Information Start>
   <e.g., Part Name>
   <e.g., Board Name>
   <e.g., Tool Version>
   <e.g., Customer Identifier>
   . . .
<General Information End>
<Core B; Instance 1 Start>
   <Vendor Name>
   <IP VLNV>
   <Core Configuration Parameters>
   <Core Instance Identifier>
   . . .
<Core B; Instance 1 End>
<Core B; Instance 2 Start>
   . . .
<Core B; Instance 2 End>
<Licensing Information End>
```

In the example of Listing 1, the data within the "General Information" section may specify the part name (e.g., the model) of the particular accelerator with which the configuration is intended to be used, the board name (e.g., the model of card) on which the accelerator is disposed, the tool version indicating the particular tool and version of the tool (e.g., software) that generated the configuration data or bitstream, and a customer identifier. The data specified within the "General Information" section may include more or less data than illustrated in the example of Listing 1.

Following the general information, the header may include additional information for each instance of each core requiring licensing that is included in the configuration data for the user circuit design. Appreciably, any instances of cores that do not require licensing need not be specified in the header. In the example of Listing 1, for each instance of a core, information such as the vendor name, the IP VLNV (core vendor, library, name, and version to uniquely identify the core), core configuration parameters, and a core instance identifier may be specified. The core configuration parameters may not be complete or may be initially empty. The core instance identifier, for example, may be filled in or inserted by the AMS for each instance of the core at a later time.

In one example implementation, the header is not, at least initially, encrypted. In that case, the AMS is capable of reading the header to determine the need for licensing. The AMS is capable of determining each core and each instance of each core requiring licensing.

In other examples, the header may be encrypted. In one example implementation, the tags "Licensing Information Start" and "Licensing Information End" may be the only items in the header and/or configuration data that are not encrypted. The content including the tags between the "Licensing Information Start" and "Licensing Information End" tags may be encrypted using an encryption scheme of the core provider. In this example, the header may include a second portion following the header section that is not encrypted and that specifies "core instance to core instance identifier" mappings. The AMS is capable of determining that the user circuit design includes an instance of a core that requires licensing (e.g., each core and each instance of such core that requires licensing) by virtue of detecting these mappings in the second portion of the header.

In another aspect, the data may be encrypted while tags, including any nested tags, are not. For example, data in the various sections indicated by the tags may be encrypted using an encryption scheme of the core provider. In this implementation, the AMS is capable of determining that the user circuit design includes an instance of a core that requires licensing (e.g., each core and each instance of such core that requires licensing). In any case, the AMS need not be equipped to decrypt the data. The authorization software in the authorization server is capable of decrypting the data.

In block 510, the AMS inserts a core instance identifier, for each instance of each core detected in block 508, into the configuration data (e.g., the configuration bitstream). In one aspect, the AMS inserts a core instance identifier for each instance of a core into the appropriate section of the header for each respective instance. In another aspect, the AMS is also capable of inserting the core instance identifier into a location within the configuration data such that a control register of the instance of the core is implemented or instantiated in the accelerator with the core instance identifier stored therein, e.g., by default. In block 510, for example, the AMS is modifying the configuration data through insertion of the core instance identifiers.

Each core instance identifier is capable of uniquely identifying and distinguishing each instance of each core. In one aspect, the AMS is capable of generating a random number that is assigned to the instance of the core and used as the core instance identifier for the instance of the core. In general, the same core instance identifier may be used for different cores. For a given core, however, each instance of that core when implemented within a given computing environment (e.g., a data center as illustrated in FIGS. 1 and/or 2) will have a unique core instance identifier.

In the case where the header is initially unencrypted, the AMS is capable of encrypting the header after insertion of the core instance identifier. In the case where the header includes two sections, the AMS is capable of inserting the core instance identifier(s) into the appropriate locations for each core instance in the section including the mapping data. In the case where the nested tags are not encrypted, the AMS may insert the core instance identifier(s) into the appropriate locations in the header for each core instance.

In block 512, the AMS downloads the configuration data, which includes the inserted core instance identifier(s), for the requested user circuit design to an accelerator. By downloading the configuration data to the accelerator, the user circuit design is implemented in the accelerator. The instance of the core that requires licensing, however, is not yet enabled. Once the AMS downloads the configuration data to the accelerator, the AMS is capable of notifying the user host program. By not authorizing the instance of the core used in the user circuit design, licenses are not used until the instance of the core is actually started or used.

In block 514, the user host program initiates the start of the user circuit design within the accelerator. In response to starting the user circuit design, the user host program calls a function of the AMS that is configured to communicate with the authorization server. In block 516, the AMS sends the header for the user circuit design to the authorization server. The AMS is capable of detecting the header as discussed by virtue of the unencrypted tags previously described.

In block 518, the authorization server directs, or provides, the section of the header to the appropriate core plug-in. For example, the authorization software is capable of decrypting the data within the header. As such, the authorization software is capable of providing each different section of the header (corresponding to a different instance of a core) to the correct core plug-in.

For example, referring to FIG. 2, the authorization software, upon receipt of the header from the AMS, is capable of decrypting the encrypted portions of the header and understand the tags and overall structure of the header to direct the data between "Core B; Instance 1 Start" and "Core B; Instance 1 End" to the core B plug-in. Similarly, the authorization software is able to direct the data between "Core B; Instance 2 Start" and "Core B; Instance 2 End" to the core B plug-in for processing. In general, the authorization software is capable of directing the different sections of data for each instance of each core to the correct core plug-in. In the case where the header includes a second section, the authorization software is also capable of providing the core instance to core instance identifier mapping(s) to the appropriate plug-ins.

In block 520, the core plug-in is capable of operating on the received section of the header and determining authorization data for the instance of the core. Each core plug-in, for example, that receives a section of the header is capable of performing any operations necessary to obtain authorization data for the instance of the core associated with the received section of the header. The core B plug-in, for example, is capable of using the received section of the header for instance 1 of core B (which may include the core instance identifier) to obtain authorization data for instance 1 of core B. Similarly, the core B plug-in is capable of using the received section header for instance 2 of core B to obtain authorization data for instance 2 of core B, and so on.

The core B plug-in is capable of obtaining values for the core configuration parameters of each instance of core B. As discussed, if necessary, each plug-in is capable of contacting the vendor or provider of the core to obtain correct authorization data for each instance of each core that is licensed by the provider and included in the user circuit design. In one aspect, the core plug-in may provide the core provider server with the core instance identifier of each instance of a core for which authorization data is being sought.

Listing 2 illustrates an example of the authorization data that is determined by the core plug-in for the instance of the core. In the example below, address-data pairs are now obtained for each instance of the core.

Listing 2

<Licensing Programming Start>
<Core B; Instance 1 Start>
    <core instance identifier>
    <Address offset b><data>
    <address offset c><data>
    . . .
<Core B; Instance 1 End>
. . .
<Licensing Programming End>

In block 522, the authorization software receives the authorization data from the core plug-in. The core plug-in, for example, provides the obtained authorization data to the authorization software. In block 524, the authorization software provides the authorization data to the AMS that implemented the user circuit design in the accelerator. In block 526, the AMS programs the instance of the core with the authorization data. Once the AMS provides the authorization data to the instance of the core in the accelerator, the instance is capable of starting operation as determined by the particular authorization data written to the control registers of that instance of the core.

In some implementations, the user host program may also notify the AMS when operation of the user circuit design is finished. In that case, the AMS may send the header for the user circuit design to the authorization server. The authorization software executing therein may decrypt and forward the header information to the appropriate core plug-ins, which may register the fact that the instance(s) of the core(s) are no longer used. The core plug-in(s) may, for example, notify the core provider server(s) to update licensing information for the user.

FIG. 6 illustrates an example method 600 of programming the authorization data into the accelerator. In the example of FIG. 6, the control registers of the instance of the core include a unique identifier key register. The unique identifier key register is a control register that is read only and that may only be read by the instance of the core (e.g., any circuitry that is part of the core). This means that the core provider may design the core such that any data read from the unique identifier key register may be maintained completely within the instance of the core and not output to circuitry external to the instance of the core. The unique identifier key register cannot be accessed (read or written) from/by any circuitry and/or system that is outside of, e.g., external to, the instance of the core itself. For example, instance 2 of core B is unable to read or write the unique identifier key register of instance 1 of core B. Similarly, any other circuitry in the accelerator, e.g., the PCIe interface or other supporting circuitry, is unable to read or write to the unique identifier key register. A host system is also unable to read or write any unique identifier key register of any instance of any core.

The unique identifier key register may be included in the core by the electronic design automation tools when developed. As such, the unique identifier key register may be found within the configuration data by the AMS thereby allowing the AMS to change the value that is stored in the unique identifier register.

In block 602, the AMS modifies the configuration data to include a core instance identifier as described in connection with block 402 of FIG. 4 and/or in block 510 of FIG. 5 in the configuration data for the user circuit design. The AMS, for example, modifies the configuration data by inserting the core instance identifier within the configuration data to change the value stored in the unique identifier key register of the instance of the core. As such, immediately upon implementation within the accelerator, the unique identifier key register of the instance of the core stores the core instance identifier created by the AMS.

In block 604, the AMS programs the accelerator with the modified configuration data thereby implementing the instance of the core as described in connection with block 404 of FIG. 4 and block 512 of FIG. 5. As noted, the unique identifier key register of the control registers of the instance of the core is pre-programmed with the core instance identifier generated by the AMS.

In block 606, subsequent to the AMS receiving the authorization data from the core plug-in corresponding to the instance of the core, the AMS provides the authorization data to the instance of the core as described in connection with block 408 of FIG. 4 and block 524 of FIG. 5. In the example of FIG. 6, the authorization data is encrypted. In one example, the authorization data is encrypted by the core provider server. As an example, the authorization data may be encrypted by performing an exclusive OR operation on the address/data pairs (e.g., the configuration parameters) using the core instance identifier generated by the AMS for the instance of the core. As noted, the core plug-in may provide the core instance identifier to the core provider server when obtaining authorization data for the core. Further, the core instance identifier is the same value also stored in the unique identifier key register within the instance of the core.

In another example, the core plug-in itself may encrypt the authorization data using the core instance identifier. The core plug-in, for example, may not communicate with a server of the core provider to obtain authorization data. In such cases, the core plug-in generates the authorization data itself and may perform the encryption. Alternatively, the core plug-in may perform the encryption even in cases where the authorization data is obtained from the server of the core provider. In any case, it should be appreciated that the encryption performed, whether by the core plug-in or the core provider server, using the core instance identifier may utilize any of a variety of encryption techniques and/or algorithms and is not intended to be limited by the particular examples provided herein.

Accordingly, in block 608, the decryption circuitry in the instance of the core is capable of decrypting the received authorization data using the core instance identifier from the unique identifier key register. Using the prior example, the decryption circuitry may decrypt the authorization data by performing another exclusive OR operation or other decryption technique on the received authorization data using the value read from the unique identifier key register. Subsequent to block 608, the original address/data pairs are recovered. Accordingly, in block 610, the control circuitry of the instance of the core writes the data to the correct addresses in the control registers of the instance of the core.

As discussed, each instance of a same core will have a unique core instance identifier. As such, if authorization data for a first instance of a first core is used for a different core or for a different instance of the same core, the decryption operation will generate faulty or incorrect authorization data to be written to the control registers, thereby defeating attempts to reuse authorization data across cores or across instances of same cores.

In the example of FIG. 6, use of exclusive OR as the mechanism for decryption provides a lightweight decryption circuit. Since each instance of the core operates as a slave and includes its own decryption circuitry, ensuring that the decryption circuitry does not consume too many resources of the accelerator is significant as the accelerator may include many instances of cores, each having their own encryption circuitry. Other more complex circuits supporting more complex encryption may consume more accelerator resources particularly when replicated across the accelerator. Still, as discussed, the particular encryption scheme used and corresponding decryption circuitry included in each instance of a core may be determined by the core provider and is not limited to the particular examples described.

In another example, the core provider server may provide the core instance identifier back with the authorization data. In that case, the AMS may further compare the core instance identifier received back with the authorization data from the core provider server with the core instance identifier the AMS previously generated to ensure that both match as an additional sanity check.

FIG. 7 illustrates another example method 700 of controlling cores within a computing environment that uses accelerators. In the example of FIG. 7, the configuration data for the instance of the core is not modified as was the case in block 602 of FIG. 6. Accordingly, the control registers of the instance of the core may omit the unique identifier key register. In the example of FIG. 7, the control registers include a control register called the unique identifier value register. The unique identifier value register, may only be read by the instance of the core (e.g., any circuitry that is part of the core), but cannot be read by any circuitry and/or system that is outside of, e.g., external to, the instance of the core itself. Unlike the unique identifier key register, the unique identifier value register may be written by circuitry within the instance of the core in response to an instruction from the AMS. For purposes of illustration, method 700 presumes that the user host program has determined that a user circuit design is needed in the accelerator, that configuration data for the requested user circuit design has been retrieved, and that the user circuit design includes one or more instances of a core that requires licensing as generally described in blocks 502, 504, 506, and 508 of FIG. 5.

In block 702, the AMS programs the accelerator with the configuration data thereby implementing the instance of the core within the accelerator. In block 704, subsequent to the AMS receiving the authorization data from the core plug-in corresponding to the instance of the core, the AMS provides the authorization data to the instance of the core. The authorization data is encrypted as described in connection with FIG. 6.

In block 706, the control circuitry in the instance of the core writes the received and encrypted authorization data to holding registers. Holding registers may be implemented as additional registers within the instance of the core intended to hold encrypted authorization data. In one aspect, the holding registers are included in the control circuitry. In another aspect, the holding registers may be select control registers designated for this purpose that are not operative in authorizing functions of the instance of the core.

In block 708, the AMS is capable of writing the core instance identifier to the unique identifier value register of the instance of the core. In block 710, the decryption circuitry in the instance of the core decrypts the received authorization data using the core instance identifier stored in, and read from, the unique identifier key register. In block 712, the control circuitry of the instance of the core writes the authorization data to correct addresses in the control registers (e.g., to control registers as opposed to the holding registers) thereby authorizing (e.g., licensing) the instance of the core. In block 714, the control circuitry locks the control registers in response to writing the control registers with the unencrypted authorization data. For example, in response to the control circuitry writing each control register with the decrypted authorization data, the control circuitry may lock such control register.

Referring to both FIGS. 6 and 7, both techniques allow each instance of a core to be programmed for authorization purposes only one time. This prevents brute force attempts at guessing the core instance identifier generated for each instance of each core.

FIG. 8 is an example method 800 of operation for an accelerator as described in connection with FIGS. 1-7 of this disclosure. In block 802, an instance of a core is implemented in the accelerator by configuring the accelerator using configuration data. The configuration data may specify a user circuit design that includes the instance of the core. In block 804, the accelerator receives encrypted authorization data for the instance of the core. The encrypted authorization data may be received within or by the instance of the core, e.g., by the control circuitry therein. In block 806, the instance of the core, e.g., the control circuitry therein, generates decrypted authorization data for the instance of the core by decrypting the encrypted authorization data using a core instance identifier stored in a first control register of the core. The core instance identifier may be provided to the core using any of the mechanisms described within this disclosure. In block 808, the control circuitry writes the decrypted authorization data to a second control register in the instance of the core. The instance of the core enables the core functionality therein based on the decrypted authorization data in the second control register.

FIG. 9 is an example method 900 of operation for a host system as described in connection with FIGS. 1-7 of this disclosure. In block 902, in response to determining a need for implementing a user circuit design in an accelerator, the host processor is capable of retrieving configuration data for the user circuit design. In block 904, the host processor is capable of determining that the user circuit design includes an instance of a core that requires licensing. In block 906, the host processor is capable of implementing the instance of the core within the accelerator by providing the configuration data for the instance of the core to the accelerator. In block 908, the host processor is capable of determining authorization data for the instance of the core. In block 910, the host processor is capable of providing the authorization data to the instance of the core, wherein the authorization data is encrypted. In block 912, a core instance identifier is provided to the accelerator for decrypting the authorization data to enable functionality of the instance of the core. As noted, the core instance identifier may be provided to the instance of the core using any of the various mechanisms described within this disclosure.

Figure 10:
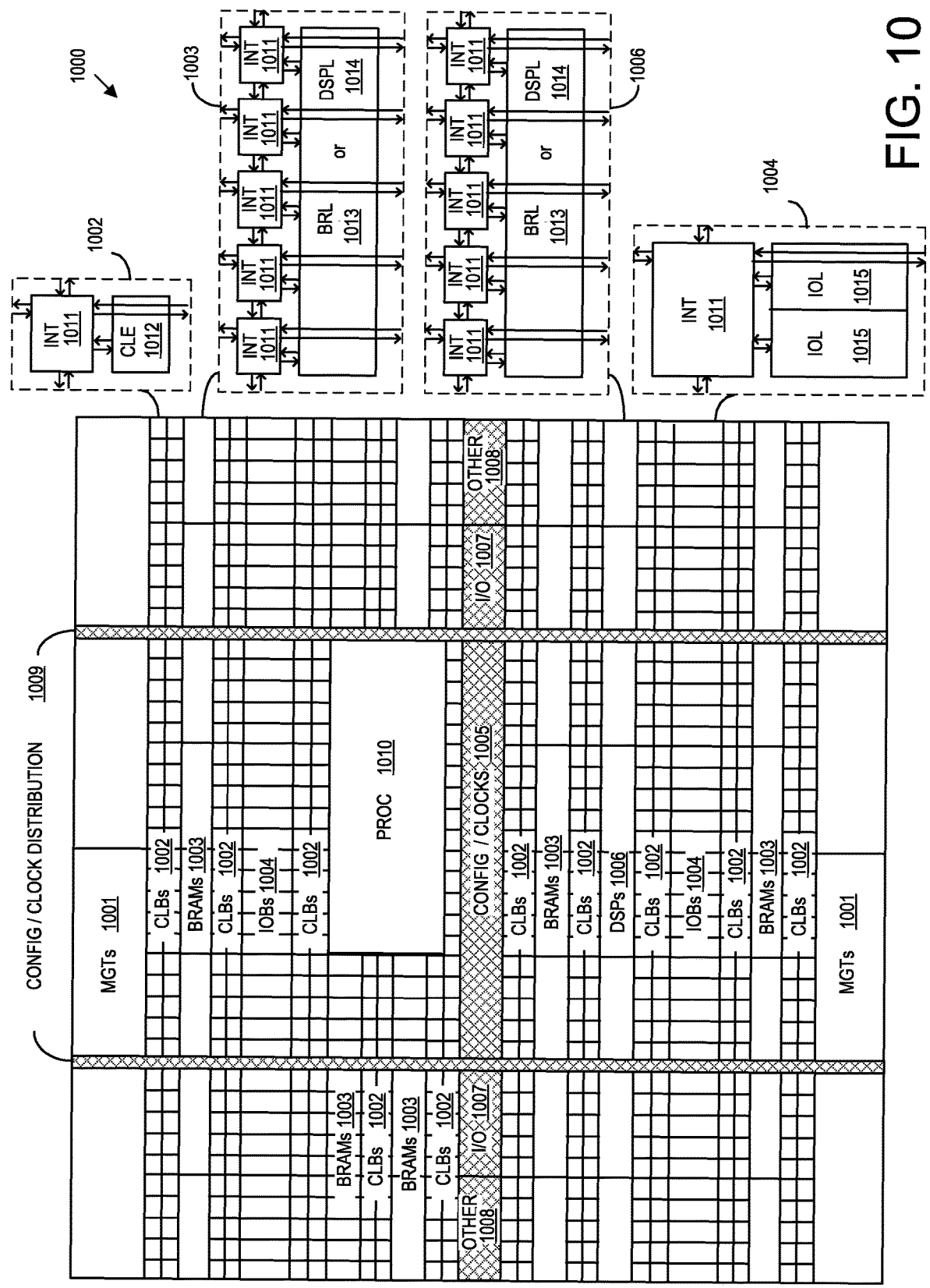
FIG. 10 illustrates an example architecture for an integrated circuit.

FIG. 10 illustrates an example architecture 1000 for an IC. In one aspect, architecture 1000 may be implemented within a programmable IC. For example, architecture 1000 may be used to implement a field programmable gate array (FPGA) that is used as an accelerator. Architecture 1000 may also be representative of a system-on-chip (SoC) type of IC. An SoC is an IC that includes a processor that executes program code and one or more other circuits. The other circuits may be implemented as hardwired circuitry, programmable logic, and/or a combination thereof. The circuits may operate cooperatively with one another and/or with the processor.

As shown, architecture 1000 includes several different types of programmable circuit, e.g., logic, blocks. For example, architecture 1000 may include a large number of different programmable tiles including multi-gigabit transceivers (MGTs) 1001, configurable logic blocks (CLBs) 1002, random access memory blocks (BRAMs) 1003, input/output blocks (IOBs) 1004, configuration and clocking logic (CONFIG/CLOCKS) 1005, digital signal processing blocks (DSPs) 1006, specialized I/O blocks 1007 (e.g., configuration ports and clock ports), and other programmable logic 1008 such as digital clock managers, analog-to-digital converters, system monitoring logic, and so forth.

In some ICs, each programmable tile includes a programmable interconnect element (INT) 1011 having standardized connections to and from a corresponding INT 1011 in each adjacent tile. Therefore, INTs 1011, taken together, implement the programmable interconnect structure for the illustrated IC. Each INT 1011 also includes the connections to and from the programmable logic element within the same tile, as shown by the examples included at the top of FIG. 10.

For example, a CLB 1002 may include a configurable logic element (CLE) 1012 that may be programmed to implement user logic plus a single INT 1011. A BRAM 1003 may include a BRAM logic element (BRL) 1013 in addition to one or more INTs 1011. Typically, the number of INTs 1011 included in a tile depends on the height of the tile. As pictured, a BRAM tile has the same height as five CLBs, but other numbers (e.g., four) also may be used. A DSP tile 1006 may include a DSP logic element (DSPL) 1014 in addition to an appropriate number of INTs 1011. An IOB 1004 may include, for example, two instances of an I/O logic element (IOL) 1015 in addition to one instance of an INT 1011. The actual I/O pads connected to IOL 1015 may not be confined to the area of IOL 1015.

In the example pictured in FIG. 10, a horizontal area near the center of the die, e.g., formed of regions 1005, 1007, and 1008, may be used for configuration, clock, and other control logic. Vertical areas 1009 extending from this horizontal area may be used to distribute the clocks and configuration signals across the breadth of the programmable IC.

Some ICs utilizing the architecture illustrated in FIG. 10 include additional logic blocks that disrupt the regular columnar structure making up a large part of the IC. The additional logic blocks may be programmable blocks and/or dedicated circuitry. For example, a processor block depicted as PROC 1010 spans several columns of CLBs and BRAMs.

In one aspect, PROC 1010 may be implemented as dedicated circuitry, e.g., as a hardwired processor, that is fabricated as part of the die that implements the programmable logic of the IC. PROC 1010 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1010 may be omitted from architecture 1000 and replaced with one or more of the other varieties of the programmable blocks described. Further, such blocks may be utilized to form a "soft processor" in that the various blocks of programmable logic may be used to form a processor that can execute program code as is the case with PROC 1010.

In general, the functionality of programmable logic is not established until configuration data is loaded into the IC. A set of configuration bits may be used to program programmable logic of an IC such as an FPGA. The configuration bit(s) typically are referred to as a "configuration bitstream." In general, programmable logic is not operational or functional without first loading a configuration bitstream into the IC. The configuration bitstream effectively implements a particular circuit design within the programmable logic. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable logic, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable logic as the hardwired circuitry is operable and has a particular function when manufactured as part of the IC.

In the case of an SoC, the configuration bitstream may specify the circuitry that is to be implemented within the programmable logic and the program code that is to be executed by PROC 1010 or a soft processor. In some cases, architecture 1000 includes a dedicated configuration processor that loads the configuration bitstream to the appropriate configuration memory and/or processor memory. The dedicated configuration processor does not execute user-specified program code. In other cases, architecture 1000 may utilize PROC 1010 to receive the configuration bitstream, load the configuration bitstream into appropriate configuration memory, and/or extract program code for execution.

FIG. 10 is intended to illustrate an example architecture that may be used to implement an IC that includes programmable logic, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 10 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1010 within the IC are for purposes of illustration only and are not intended as limitations.

The example implementations within this disclosure are largely described in the context of a programmable IC used as an accelerator where user circuit designs are implemented in the accelerator. In other example implementations, the techniques described herein may be used with accelerators that receive executable program code. For example, if the accelerators are configured to include a circuit architecture as described herein, the inventive arrangements may be used to authorize instances of cores implemented as executable program code (e.g., user executable program code that includes executable cores that are licensable) instead of user circuit designs. In still other example implementations, the techniques described herein may be used with accelerator architectures that include both programmable logic, processors capable of executing program code, and/or other configurable circuit blocks.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without intervention of a human being. In some implementations, a user may mean a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit. The hardware circuit may be configured to carry out instructions contained in program code. The hardware circuit may be an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method includes implementing, within an accelerator, an instance of a core by configuring the accelerator using configuration data, receiving, within the instance of the core, encrypted authorization data for the instance of the core, and generating, using control circuitry within the instance of the core, decrypted authorization data for the instance of the core by decrypting the encrypted authorization data using a core instance identifier stored in a first control register of the instance of the core. The core instance identifier is unique to the instance of the core. The method can include writing the decrypted authorization data to a second control register in the instance of the core, wherein the instance of the core enables core functionality therein based on the decrypted authorization data in the second control register.

In another aspect, the method can include first detecting the instance of the core within the configuration data and determining that the instance of the core requires authorization.

In another aspect, the authorization data includes one or more address-data pairs.

In another aspect, the method can include first modifying the configuration data to include the core instance identifier, wherein the instance of the core is implemented having the core instance identifier stored in the first control register.

In another aspect, the implementing the instance of the core within the accelerator includes instantiating the first control register storing the core instance identifier.

In another aspect, the first control register is not writable and is readable only by circuitry within the instance of the core. Further, the second control register is readable and writable only by circuitry within the instance of the core.

In another aspect, the core instance identifier is written to the first control register subsequent to implementation of the instance of the core in the accelerator. In that case, the method can include locking the second control register in response to the writing the decrypted authorization data.

In another aspect, a system includes a host processor configured to initiate operations. The operations include, in response to determining a need for implementing a user circuit design in an accelerator, retrieving configuration data for the user circuit design, determining that the user circuit design includes an instance of a core that requires licensing, implementing the instance of the core within the accelerator by providing the configuration data for the instance of the core to the accelerator, and determining authorization data for the instance of the core. The operations can also include providing the authorization data to the instance of the core, wherein the authorization data is encrypted. A core instance identifier is provided to the accelerator for decrypting the authorization data to enable functionality of the instance of the core. The core instance identifier is unique to the instance of the core.

In another aspect, the providing the core instance identifier to the accelerator includes, prior to the implementing the instance of the core, modifying the configuration data to include the core instance identifier stored within a first control register of the instance of the core.

In another aspect, the core instance identifier is sent to the instance of the core subsequent to the providing the authorization data.

In another aspect, the authorization data is decrypted and written to a control register, wherein the control register is locked in response to being written with the decrypted authorization data.

In another aspect, the determining that the user circuit design includes an instance of a core that requires licensing comprises parsing a header of the configuration data specifying each instance of each core of the user circuit design requiring licensing.

In another aspect, the host processor is configured to initiate operations further including providing the header to a core plug-in executed by the host processor and that is configured to generate authorization data for each instance of the core.

In another aspect, the authorization data includes one or more address-data pairs.

In another aspect, a device includes an instance of a core implemented in programmable logic by loading configuration data, a plurality of control registers implemented in the instance of the core. The plurality of control registers include a first control register configured to store a core instance identifier that uniquely identifies the instance of the core and a second control register that, when written with authorization data from a host computing system, determines enablement of core functionality of the instance of the core.

In another aspect, the core instance identifier is embedded in the configuration data by a host system in response to selecting the configuration data for implementation in the device.

In another aspect, the first control register is implemented storing the core instance identifier, is not writable, and is readable only by circuitry within the instance of the core. Further, the second control register is readable and writable only by circuitry within the instance of the core.

In another aspect, the authorization data is encrypted authorization data. In that case, the instance of the core includes circuitry that decrypts the encrypted authorization data using the core instance identifier and writes the decrypted authorization data to the second control register.

In another aspect, the circuitry that decrypts the authorization data performs an exclusive OR of the encrypted authorization data and the core instance identifier.

In another aspect, the core instance identifier is received from a host system subsequent to receiving the authorization data from the host system.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    implementing, within an accelerator, an instance of a core in programmable logic by configuring the accelerator using configuration data, wherein the instance of the core is one of a plurality of different instances of the core implemented in a computing system including the accelerator;
    wherein the configuration data implements the instance of the core with a first control resister that is read only and only readable by circuitry of the instance of the core, and wherein the configuration data, prior to loading in the accelerator, is modified to include, within the first control register, a core instance identifier unique to the instance of the core;
    receiving, within the instance of the core, encrypted authorization data specific to the instance of the core;
    generating, using control circuitry within the instance of the core, decrypted authorization data for the instance of the core by decrypting the encrypted authorization data using the core instance identifier; and
    writing the decrypted authorization data to a second control register in the instance of the core, wherein the instance of the core enables core functionality therein based on the decrypted authorization data in the second control register.

2. The method of claim 1, further comprising:
    first detecting the instance of the core within the configuration data and determining that the instance of the core requires authorization.

3. The method of claim 1, wherein the authorization data includes one or more address-data pairs.

4. The method of claim 1, wherein the instance of the core is implemented having the core instance identifier stored in the first control register.

5. The method of claim 4, wherein the implementing the instance of the core within the accelerator comprises:

instantiating the first control register storing the core instance identifier.

6. The method of claim 1, wherein:
the second control register is readable and writable only by circuitry within the instance of the core.

7. The method of claim 1, wherein the writing the decrypted authorization data to the second control register permits the instance of the core to be authorized one time.

8. A system, comprising:
a host processor configured to initiate operations including:
in response to determining a need for implementing a user circuit design in an accelerator, retrieving configuration data for the user circuit design,
determining that the user circuit design includes an instance of a core that requires licensing;
implementing the instance of the core within the accelerator by providing the configuration data for the instance of the core to the accelerator;
wherein the configuration data implements the instance of the core with a first control resister, and wherein the first control resister is readable only by circuitry within the instance of the core;
determining authorization data for the instance of the core; and
providing the authorization data to the instance of the core, wherein the authorization data is encrypted;
wherein a core instance identifier is provided to the accelerator for decrypting the authorization data to enable functionality of the instance of the core, wherein the core instance identifier is unique to the instance of the core and is stored in the first control resister.

9. The system of claim 8, wherein the providing the core instance identifier to the accelerator comprises:
prior to the implementing the instance of the core, modifying the configuration data to include the core instance identifier stored within the first control register of the instance of the core.

10. The system of claim 8, wherein the core instance identifier is sent to the instance of the core subsequent to the providing the authorization data.

11. The system of claim 10, wherein the authorization data is decrypted and written to a control register, wherein the control register is locked in response to being written with the decrypted authorization data.

12. The system of claim 8, wherein the determining that the user circuit design includes the instance of a core that requires licensing comprises:
parsing a header of the configuration data specifying each instance of each core of the user circuit design requiring licensing.

13. The system of claim 12, wherein the host processor is configured to initiate operations further comprising:
providing the header to a core plug-in executed by the host processor and that is configured to generate authorization data for each instance of the core.

14. The system of claim 8, wherein the authorization data includes one or more address-data pairs.

15. A method, comprising:
implementing, within an accelerator, an instance of a core in programmable logic by configuring the accelerator using configuration data, wherein the instance of the core is one of a plurality of different instances of the core implemented in a computing system including the accelerator;
wherein the configuration data implements the instance of the core with a first control register, and wherein the first control register is readable only by circuitry within the instance of the core;
writing a core instance identifier to the first control register subsequent to implementation of the instance of the core in the accelerator, wherein the core instance identifier is specific to the instance of the core;
receiving, within the instance of the core, encrypted authorization data;
generating, using control circuitry within the instance of the core, decrypted authorization data for the instance of the core by decrypting the encrypted authorization data using the core instance identifier;
writing the decrypted authorization data to a second control register in the instance of the core, wherein the instance of the core enables core functionality therein based on the decrypted authorization data in the second control register; and
responsive to writing the decrypted authorization data to the second control register, locking the second control register.

16. The method of claim 15, wherein the first register is writable only by circuitry within the instance of the core in response to an instruction received from a host system communicatively linked with the accelerator.

17. The method of claim 15, further comprising:
first detecting the instance of the core within the configuration data and determining that the instance of the core requires authorization.

18. The method of claim 15, wherein the authorization data includes one or more address-data pairs.

19. The method of claim 15, wherein:
the second control register is readable and writable only by circuitry within the instance of the core.

20. The method of claim 15, wherein the locking the second control register permits the instance of the core to be authorized one time.

* * * * *

UNITED STATES PATENT AND TRADEMARK OFFICE
CERTIFICATE OF CORRECTION

| | |
|---|---|
| PATENT NO. | : 11,403,429 B1 |
| APPLICATION NO. | : 16/685921 |
| DATED | : August 2, 2022 |
| INVENTOR(S) | : David Robinson |

It is certified that error appears in the above-identified patent and that said Letters Patent is hereby corrected as shown below:

In the Claims

In Column 25, Claim 8, Line 15, "figuration data for the user circuit design," should read --figuration data for the user circuit design;--.

Signed and Sealed this
Fifteenth Day of November, 2022

Katherine Kelly Vidal
*Director of the United States Patent and Trademark Office*